(12) United States Patent
Aumiller et al.

(10) Patent No.: US 11,960,965 B1
(45) Date of Patent: Apr. 16, 2024

(54) CHQR SMART LABEL AND SCANNING SYSTEM

(71) Applicant: HNU Photonics LLC, Kahului, HI (US)

(72) Inventors: Riley Aumiller, Wailuku, HI (US); Daniel G. O'Connell, Kihei, HI (US); Derrick Torricer, Kahului, HI (US)

(73) Assignee: HNU PHOTONICS LLC, Kahului, HI (US)

( * ) Notice: Subject to any disclaimer, the term of this patent is extended or adjusted under 35 U.S.C. 154(b) by 0 days.

(21) Appl. No.: 17/198,432

(22) Filed: Mar. 11, 2021

Related U.S. Application Data (60) Provisional application No. 62/987,921, filed on Mar. 11, 2020.

(51) Int. Cl.
G06K 7/14 (2006.01)
G06K 7/12 (2006.01)
G06K 19/06 (2006.01)

(52) U.S. Cl.
CPC .......... *G06K 7/1417* (2013.01); *G06K 7/12* (2013.01); *G06K 19/06065* (2013.01); *G06K 19/0614* (2013.01)

(58) Field of Classification Search
CPC .. G06K 7/1417; G06K 7/12; G06K 19/06065; G06K 19/0614
See application file for complete search history.

(56) References Cited

U.S. PATENT DOCUMENTS

| | | | |
|---|---|---|---|
| 2009/0060259 A1* | 3/2009 | Goncalves | G06V 10/757 382/100 |
| 2019/0253254 A1* | 8/2019 | Brownlee | H04L 9/3239 |

\* cited by examiner

*Primary Examiner* — Matthew Mikels
(74) *Attorney, Agent, or Firm* — Cermak Nakajima & McGowan LLP; James Creighton Wray (57) ABSTRACT

Color Holographic Quick Response CHQR labels are scanned at identified locations by scanners that add their time, location, identification and process coded in the labels. The scanners scan and send that information and the scan data to a database having identification of all labels. The database verifies the scanner information to avoid counterfeiting. The information is hashed in the database, scanner and labels. Multiple labels of different types have distributed parts of the coded information and a decoding key. Color Holographic Quick Response labels have integrated radio frequency labels.

12 Claims, 12 Drawing Sheets

CHQR SMART LABEL AND SCANNING SYSTEM

This application claims the benefit of U.S. Provisional Application No. 62/987,921 filed Mar. 11, 2020, which is hereby incorporated by reference in its entirety as if fully set forth herein.

SUMMARY OF THE INVENTION

The CHQR smart label and scanning system is a combination of several key technologies:
  label information that can be encoded using any combination of a variety of information storage, transmission, and writing methods utilizing single or multiple labels;
  scanning hardware and software able to detect, receive, decode label information, update label information as needed, as well as provide additional information related to the situational and environmental details of the label detection and device interactions;
  and computer and database systems that can actively log, analyze, and react to the collected information.

The CHQR smart label system has applications in anti-counterfeiting methods, supply chain monitoring and management, product authentication, package and shipping logistics, business inventory management, automation systems, retailer operations, customer/user engagement, anti-theft systems, product information displays, as well as automated ordering and inventory systems.

Label Information Encoding Methods:

Label information can be encoded utilizing a variety of information storage and transmission methods. Some of these methods include visible printed labels, printed labels with inks outside of the visual spectrum, alphanumeric printing of information, symbology-based encoding and printing of information, linear barcodes, two-dimensional barcodes, 2D matrix codes, stacked codes, human readable codes, radio frequency identification, bluetooth, wifi data transmission, optical based encoding of information, color based encoding of information, spectrum based encoding of information, polarization based encoding of information, optical intensity based encoding of information, coherence based encoding of information, time sequential based encoding of information, etc. The label can be visible, invisible, covertly located, physically accessible, physically inaccessible with only wireless interaction.

Scanning Hardware and Software Capabilities:

Scanning hardware and software can utilize detectors, receivers, and transmitters covering single or multiple parts of the electromagnetic spectrum including optical based hardware operating at UV, visible, or infrared wavelengths; radio frequency based hardware, etc.

Computer and Database System Information:

Details of the computer and database systems that can actively log, analyze, and react to the collected information as well examples of the types of information to be collected by the CHQR systems are presented below. A variety of databases will be in operation for the generated CHQR labels, the CHQR scanner hardware and software systems, the information and status of the data encoded in each label, as well as databases specific to operations with certain, people, personnel, or entities each with varying levels of internal and external database integrations.

Some of the specific capabilities of the CHQR scanner app and associated back end product database are the use of authorized users within the scanning software application; the ability to decode label data in printed labels, RFID labels, or a combination of the two; recording of scanner and label activity, timestamp, and geolocation data; as well as the ability to nest information from various labels allowing complete information access for labels on products, individual packaging, and case/crate level packaging as they progress through the supply chain.

When first operating the scanner device and software application the user must provide a login authentication to verify that they are an authorized user of the scanner. Depending upon the stored database settings for that particular user a specific authorization level can be applied to enable or restrict certain functions. For example, an administrator user can have the ability to update or modify parameters in the database describing a product, such as recording the application of a firmware update to specific product, while a user without administrative access may be limited to only passively scanning the CHQR labels.

Within the CHQR scanner software application, different levels of authorization can be applied to restrict or enable the user's access to certain types of information either recorded in the label itself or stored within the CHQR systems' database entries. These restrictions could be applied broadly based on predesignated user types such as administrator, manufacturer, retailer, or final end user customer. Alternatively the information access on the label and databases could be determined on a case by case basis with varying access constraints for individual scanner users. Such a system would enable the various types of users to access only pertinent information for their applications. End user customers would be able to see details such as product expiration dates, product specifications, operating instructions, etc. Retailers would be able to access product delivery dates and locations, price history, inventory levels, date and location of product sales, customer order numbers, incoming product shipments, locations, and dates, etc. Manufacturers would be able to access detailed information on the products components and subsystems, providing a complete bill of materials, product manufacturing dates, product shipping dates, product revision information, quality assurance information, acceptance and performance test data for the given product, specification and testing details for subsystems and components, etc. Administrative accounts would be able to access all of the information above as well as complete details of the labeled device as it progressed throughout the entire supply chain from initial component manufacturers to the delivery to the end user.

The CHQR scanner app software can provide the ability to use both a smartphone's integrated camera for the scanning of printed CHQR labels as well as device's integrated RFID reader hardware. This allows the CHQR scanner app to read individual printed labels, RFID labels, or utilize a combination of the two to store product data and provide authorized database access for additional product status information.

The CHQR scanner app is able to record the complete history of scanner and label activity. For every scanner interaction with a label, the database is able to store the timestamp, GPS position, user, scanner hardware identifier, and label ID for every completed scan of a label by a scanner. This database information is never overwritten. Subsequent scans provide information that is only appended to existing entities within the database to provide a complete history of activity. Similarly, for any given CHQR product label the database is able to provide information on when and where the label was scanned throughout the supply chain. It will also provide the authorized user who completed each scan and the unique ID number of the specific scanner used to complete the scan.

The scanner will record details of its complete operating history including details of user login history, timestamps for when the scanner and its software application is activated, details of when the scanner device is powered off, GPS location history for when the scanner is active, details of user login attempts, details of the authentication method be it password, facial recognition, fingerprint identification, etc. With each scanner having its own unique identifier, these logs will record the complete operating history of every CHQR scanner. The connection between the scanner and database can also be active with database values imposing limits on the operation of the scanner such as geofencing the operation of a given scanner to be restricted to certain physical location.

The database framework allows for the nesting of information from multiple CHQR labels. This will allow for CHQR labels to be applied directly to individual products, the packaging used for each product, and the case/crate level packaging used when distributing products. The nesting of label information within the database will allow an authorized user to access the detailed information regarding the products as well as the specific items or product serial numbers contained within a given level of product packaging. This will aid in the tracking of specific products throughout the supply chain as well as providing inventory management solutions for CHQR customers.

Another potential feature for CHQR labels is for every CHQR label to have its own unique label identification number. This number will serve as a serial number for the label itself, completely separate from the data contents of the label. No two CHQR labels will have same label serial number. There will be a central database/server that will record the label serial number for every generated CHQR label. The software used to generate each CHQR label will incorporate a network connection to a central CHQR server. The server will issue a CHQR label serial number values for every CHQR label generated by the software. This will provide one level of anti-counterfeit protection. Since every CHQR label has its own uniquely issued label serial number embedded in the label, a scanner can perform a check of the label it scanned to a database of issued label serial numbers. If the scanned label contains a label serial number not found in the database, outside the range of issued serial numbers then the operator will know that the scanned CHQR label is NOT authentic.

The central CHQR server has the ability to store additional data for each CHQR label to provide additional checks for authentication. For example, when a CHQR label with a specific label serial number is first generated, a copy of the entire data content of that label could be sent and stored on the server. Now when a scanning device scans the label, it can provide both a check of the label serial number with the CHQR server database as well as a check of all of the data contained within the label to see if the data decoded from the label matches the data used when that specific serial numbered label was generated. If the data within the label was modified in any way or if an inauthentic label was applied with information that did not match the values at the time the CHQR label was generated, the scanner would alert the operator that the scanned CHQR label may not be authentic.

In situations where the content of the label is confidential, a similar check can be applied by utilizing and storing a secure cryptographic hash of the label data rather than the label data itself. This hash value would be uniquely associated to the exact data contents of the label. If the data were modified in any way, the mathematical hash generating algorithm of the data would have a different output indicating that the label's data content does not match the content used when generating the label. This is all done with secure mathematical processes allowing the server to store only the hash value of the data for each serial number CHQR label, rather than the confidential data itself, with no mathematical possibility of using the hash value to determine the original confidential information. The CHQR scanner can use this hash value to verify the data authenticity of every scanned label by comparing the hash of the decoded label data to the hash stored on the CHQR server for that particular CHQR label serial number.

When using multiple labels or multiple types of labels to store the data for a given tagged product/object there are a variety of methods for how that data can be distributed or encrypted across the multiple labels. For example, consider the case of a combined visible printed CHQR label that also incorporates an RFID component for additional data storage. The label information stored in the RFID can be digitally encrypted using any of the standard secure encryption methods such as the Advanced Encryption Standard (AES). Upon reading the encrypted data from the RFID portion of the label, the data would be read as a meaningless jumble due to the applied encryption. The encoded data in the printed visible portion of the CHQR label could provide the key or password needed to decrypt the digital data from the RFID portion of the label. Since the printed visible label is able to store multiple channels of information, it could also hold additional plain text unencrypted product information or additional encrypted information as well as the decryption key. Similarly, with each portion of the label able to hold different amounts of information, potentially spread out over different channels within a given label, any combination of storing plain unencrypted data, encrypted data, or decryption keys could be used for the label data distributed across the portions of the combined CHQR label.

For encrypted data within the label, the key to decode the label information does not necessarily need to be stored locally on the label itself. The passwords or keys to unlock the label information could be held externally, such as in a cloud database. Standard authentication methods such as two factor authentication could then be used to access this information and obtain the necessary keys to decrypt the label information. Such systems could be active to only provide access to the decryption key based on a number of factors such as limiting access time windows, geographical positioning limitations using supplied GPS data, etc.

The distribution of data across multiple labels or multiple types of labels could also be done in a mixed fashion where the encrypted or unencrypted data is partitioned/separated and interspersed across the multiple labels in a particular manner. The decoded data could not only be encrypted but also jumbled across different portions of the stored label data in a mixed fashion. Some prior knowledge would need to be obtained and utilized to appropriately unmix the decoded label information to access the encoded label data. This method of mixing could be incorporated into the scanner software or obtained via a database either stored locally on the scanning device or on the cloud. This method of mixing the label information can also be applied on a label by label basis, where the method of mixing or rearranging the data is unique to the specific label. Database systems would store the decoding method for each specific label serial number or identifier.

These and further and other objects and features of the invention are apparent in the disclosure, which includes the above and ongoing written specification, with the claims and the drawings.

DETAILED DESCRIPTION

Figure 1:
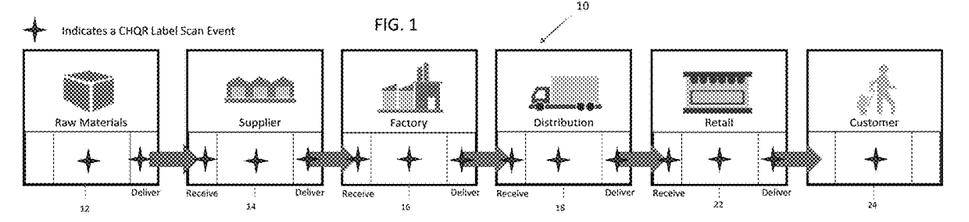
FIG. 1 shows supply chain monitoring.

Complete Supply Chain Monitoring:

FIG. 1 shows supply chain monitoring. At each scan event, information on the label and corresponding product databases will be added, detailing who is inputting the additional information, what specific details the person interacting with the scanner will be adding, when the information is being added, where the information input occurs, why the information is being added, and finally how the information is being added. The label will also detail upcoming steps for each product as it proceeds through the supply chain. This persistent collection of information provides a complete cradle-to-grave history of a product and its components. Checks of the supplied data automatically flag potential errors or discrepancies recorded by the scanners throughout the supply chain process.

The CHQR smart label scanning system provides complete recording and monitoring of a product throughout the entire manufacturing and delivery supply chain all the way to the product's use by the final end user customer, providing complete cradle to grave information coverage for the product. For every step in the supply chain process the CHQR smart label system aims to record thorough details answering the questions of who, what, when, where, why, how, and what is next in the supply chain process. The net result is a full history of each individual product's manufacturing details, with authentication and verification checks at each scanning event, and an automated database back end that actively examines the collected data and immediately reports any deficiencies or discrepancies throughout the entire supply chain process.

As previously described, every interaction of a CHQR scanner and label is able to record scanner user information, timestamp data, GPS positioning, user authentication information, which unique scanner hardware device was used to scan each label, etc. In addition to this information, details of the supply chain process can be integrated into the associated database entries for a given product's unique CHQR identification label. As the product progresses through the supply chain the associated CHQR scanners would require the scanner users to identify, record, and provide status for the current step in the process. The processing step could be selected from a premade list of steps, manually input by the user, or dynamically generated as the product progresses through manufacturing and delivery. As an example, the supply chain steps could include: initial device manufacturing from an OEM manufacturer, shipping to a systems integrator who incorporates the device into a system level product, shipping the product to a product test facility, shipping to a retailer warehouse facility, and final shipping to the customer. Throughout every step the database will cross check the recorded information to provide details such as inventory management and to ensure that no product is misplaced in the process.

Figure 2:
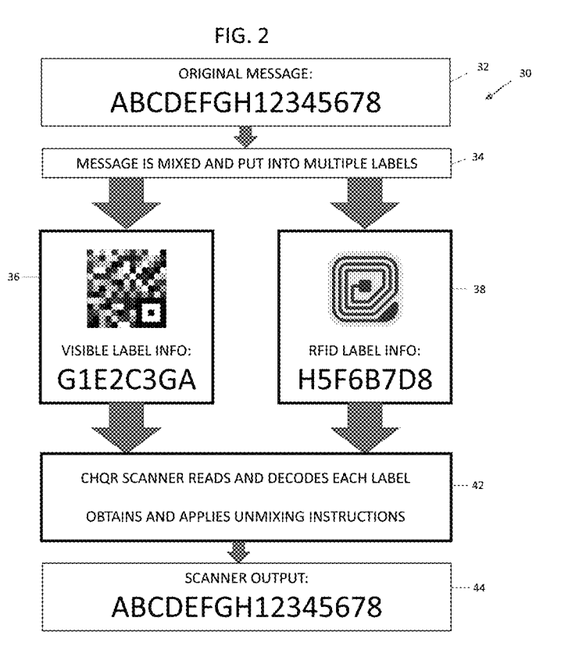
FIG. 2 shows mixing and unmixing data on different labels.

Some examples of the data to be recorded into the databases include:
Serial Number
Model Number
Model Revision Number
Firmware/Software Revision Number
Bill of Materials
Date Label Generated
Date of Manufacture
Location of Manufacture
Date Product Shipped From Manufacturer
Date Product Received for Inspection
Date Product Inspection Passed and Accepted
History of Inspection Tests and Status
History of Revision Information for Any Product Sent Back in the Acceptance Process
Date a Product is Sold
Location Where the Product was Sold FIG. 2 exemplifies the mixing and unmixing of data on different labels. It provides an example of how CHQR label information is distributed across multiple labels or multiple types of labels.

Figure 3:
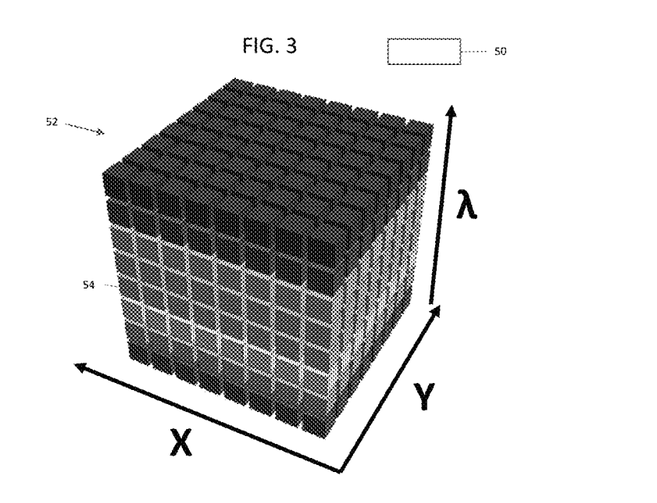
FIG. 3 shows an example of label data.

FIG. 3 shows an example of the types of data collected by CHQR label scanners. The CHQR scanner analyzes the collected data to detect a label's spatial position coordinates along the X and Y axes, while also analyzing additional data, such as wavelength data X, at every given spatial position to determine the label's value at each location.

Figure 4:
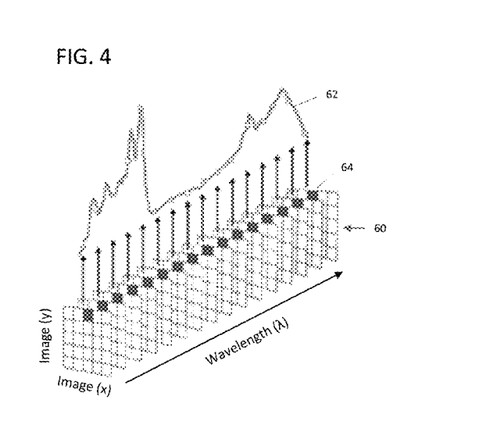
FIG. 4 shows an example of coding labels.

FIG. 4 shows an example of how the encoding of CHQR labels is done, which involves applying unique optical signatures at varying spatial locations on the label. Each unique optical signature and spatial location is associated with specific label information data. The CHQR scanner device detects these unique optical signatures.

Figure 5:
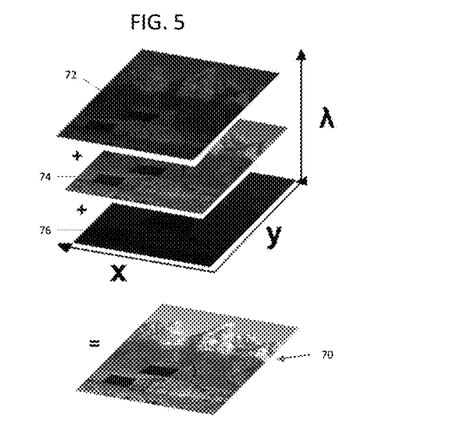
FIG. 5 shows examples of color bands.

FIG. 5 shows examples of color bands, displaying a combination of red, green, and blue color bands at varying spatial locations, x and y, for the encoding of a discrete CHQR label.

Figure 6:
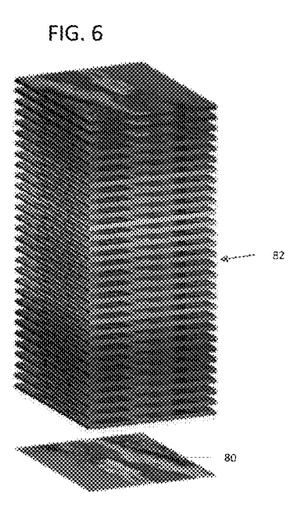
FIG. 6 shows examples of optical channel bands.

FIG. 6 shows an example of different optical channel bands being combined for the encoding of a CHQR label, with signal varying at different spatial locations.

Figure 7:
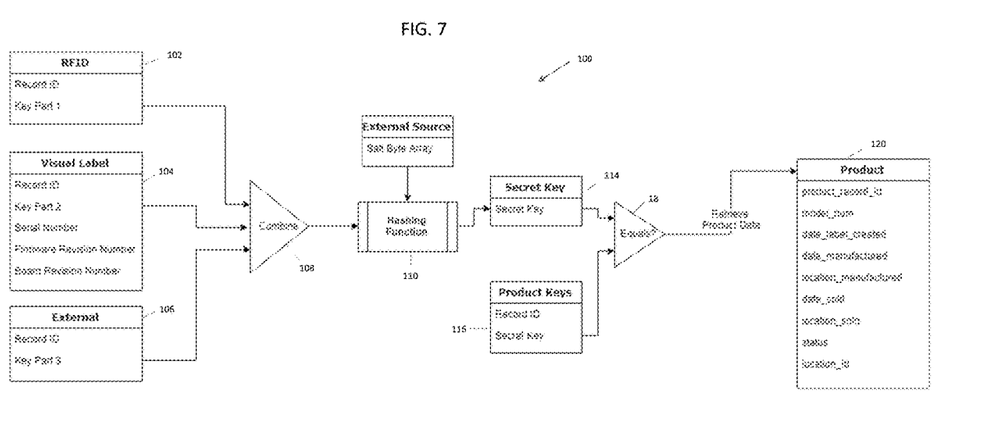
FIG. 7 is a flow diagram showing an example of steps in encrypting product data.

FIG. 7 is a flow diagram that exemplifies the step-by-step process of product data encryption stored on multiple labels.

Figure 8:
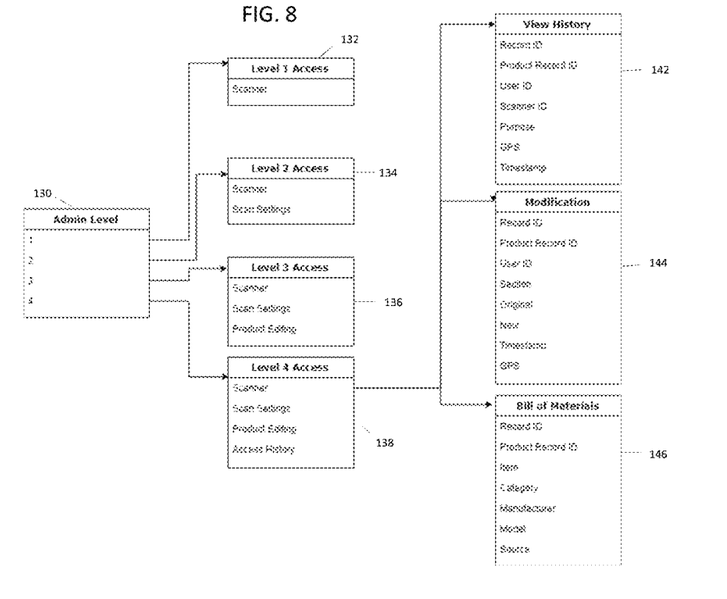
FIG. 8 is an example of levels of access to data on labels.

FIG. 8 is an example of different levels of authorization in the label decoding process that determine the level of information the party may have access to on the label and in the product databases.

Figure 9:
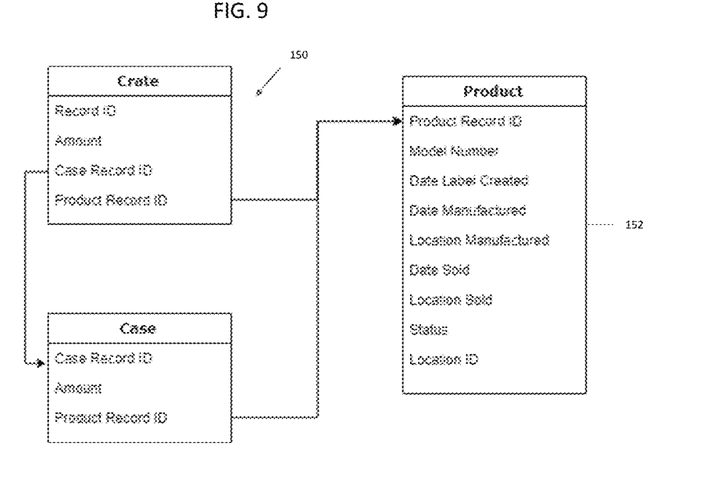
FIG. 9 shows an example of nesting labels.

FIG. 9 illustrates how information can be nested for multiple CHQR labels. In this example, a CHQR label is applied to crate level product packaging, to case level packaging, and to individual products contained in the cases and crate. The case and crate labels contain their own record information as well as details regarding what they added, changed, and/or checked for all of their contained products.

Figure 10:
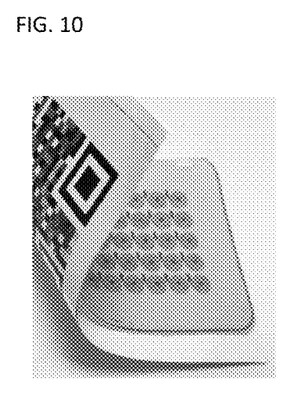
FIG. 10 shows a printed label with radio frequency components.

FIG. 10 shows a printed label featuring both visual illustrations and radio frequency components.

Figure 11:
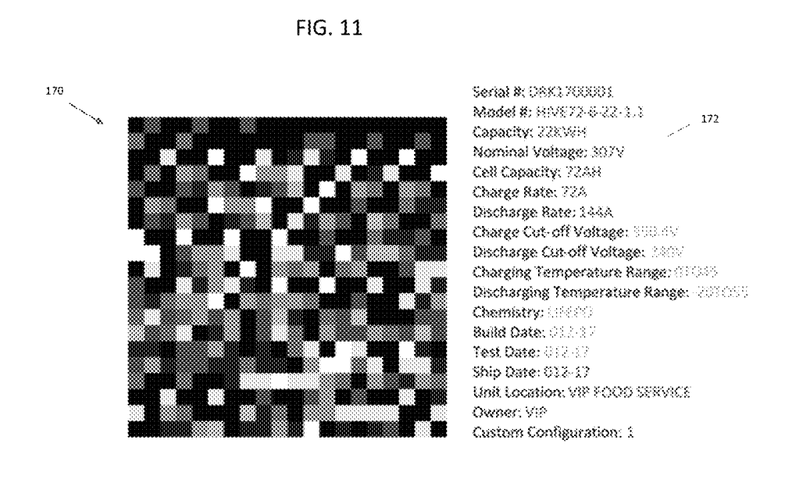
FIG. 11 Is an example of a label with encoded data.

FIG. 11 shows an example of a CHQR label as well as the extent of information that can be encoded into a CHQR label utilizing an extended palette of optical signatures over a grid of spatial locations.

Figure 12:
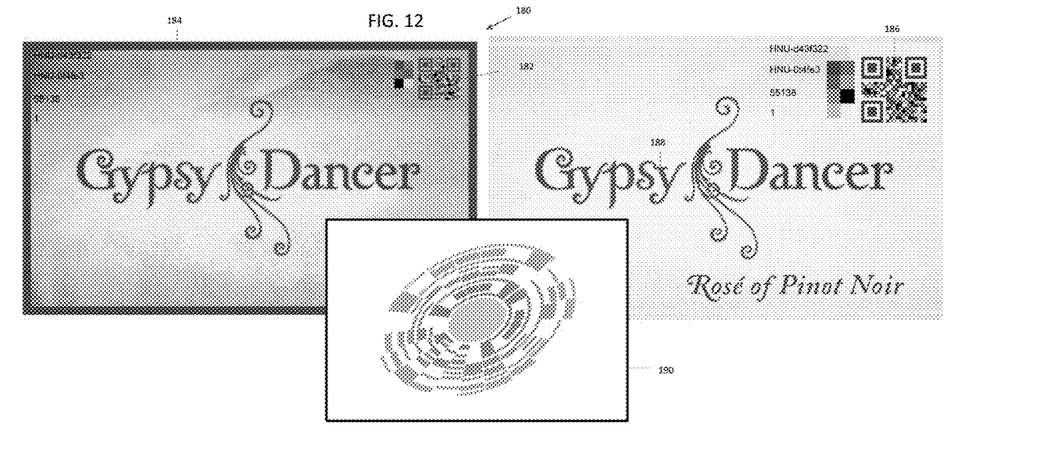
FIG. 12 is an example of a new encoded label tailored to an existing label.

FIG. 12 is an example of how a new encoded label can be tailored to the aesthetics of a given company's existing label, logo, or print. The central CHQR label image shows how the spatial arrangement of the label data can be modified beyond the traditional quadratic shape.

While the invention has been described with reference to specific embodiments, modifications and variations of the invention may be constructed without departing from the scope of the invention, which is defined in the following claims.

We claim:

1. A system comprising an anti-counterfeiting Color Holographic Quick Response (CHQR) labels and a CHQR label encoding system, and a scanning system, the CHQR label encoding system includes a CHQR label printing system, the label scanning system further comprises label scanning hardware and software for detecting, receiving and decoding CHQR label information, updating information, and further comprising CHQR label database systems adapted for logging, analyzing and reacting to the CHQR label; wherein each CHQR label has a unique label identification number, the system further comprising a central database server that records the unique CHQR label identification number, and wherein the database server is adapted to report a scanner that has a unique CHQR label identification that is valid or is not authentic and also to authorize or prevent any such scanner from being capable of reading any CHQR label and transmitting the data on that CHQR label to the database.

2. The system of claim 1, wherein the CHQR label scanning hardware and software includes hardware operating at UV, visible, and infra-red wavelengths.

3. System of claim 2, wherein the CHQR label scanning hardware and software includes radio frequency scanning.

4. The system of claim 1, wherein the database is configured for decoding information on CHQR labels, storing information on CHQR labels and comparing the decoded information with the stored information for each specific CHQR label.

5. The system of claim 4, wherein the CHQR label/database is adapted for receiving and recording raw materials, material suppliers, factory, distribution, retail and purchaser information.

6. The system of claim 5, wherein the CHQR label database is configured for recording identification of all information, receiving from a scanner a scanning of a specific CHQR label and comparing information on the specific CHQR label before and after each scanning.

7. The system of claim 6, wherein the CHQR label information database is configured for comparing all scanned data with original data on the CHQR labels and identifying what scanning location changed or attempted to change information of the original data.

8. The system of claim 1, wherein the CHQR label data is adapted for limiting the information that may be read or may be added by each particular scanning.

9. The system of claim 8, wherein the CHQR labels on particular products contain code adapted to allow a specific scanning to access specific data that is encoded on the CHQR labels.

10. The system of claim 1, wherein the database is configured to retain the information from multiple CHQR labels on the database, and a scanning station is adapted to read the code from the CHQR labels on a product to access the information about the product from the database.

11. The system of claim 1, wherein the database is adapted to store the entire data content of each product identified by a unique CHQR label identification and wherein the database is adapted to compare complete data from a scanned CHQR label with each data stored for a product identified by that CHQR label to determine if the CHQR label is authentic.

12. The system of claim 1, wherein the database is adapted to store a secure cryptographic hash value rather than data from a product identified by a specific identification, and the scanner can use the hash value to verify the data authenticity of a scanned label.

* * * * *